United States Patent
Wang et al.

(10) Patent No.: US 8,063,617 B2
(45) Date of Patent: Nov. 22, 2011

(54) QUICK RESPONSE WIDTH MODULATION FOR A VOLTAGE REGULATOR

(75) Inventors: Ting-Hung Wang, Taipei (TW);
Chia-Jung Lee, Hsinchu (TW);
Liang-Pin Tai, Tainan County (TW)

(73) Assignee: Richtek Technology Corp., Hsinchu (TW)

( * ) Notice: Subject to any disclaimer, the term of this patent is extended or adjusted under 35 U.S.C. 154(b) by 356 days.

(21) Appl. No.: 12/382,017

(22) Filed: Mar. 6, 2009

(65) Prior Publication Data
US 2009/0230932 A1    Sep. 17, 2009

(30) Foreign Application Priority Data

Mar. 11, 2008 (TW) .............................. 97108515 A

(51) Int. Cl.
*G05F 1/00* (2006.01)

(52) U.S. Cl. ........................................ 323/272; 323/284
(58) Field of Classification Search .................. 323/272, 323/283, 284
See application file for complete search history.

(56) References Cited

U.S. PATENT DOCUMENTS 6,271,650 B1 * 8/2001 Massie et al. ................. 323/272
7,812,581 B2 * 10/2010 Qiu et al. ...................... 323/272

* cited by examiner

*Primary Examiner* — Shawn Riley
(74) *Attorney, Agent, or Firm* — Rosenberg, Klein & Lee

(57) ABSTRACT

A per-phase quick response generation circuit generates a quick response signal to determine a quick response pulse to be inserted into a pulse width modulation signal of the corresponding phase. The quick response pulse will force the upper power switch of the corresponding phase on to increase the current supply ability during load transition. A multi-phase voltage regulator with the quick response generation circuit can have different quick response pulse widths for the interleaved phases, so as to decrease the current imbalance period of the voltage regulator after load transition.

44 Claims, 10 Drawing Sheets

QUICK RESPONSE WIDTH MODULATION FOR A VOLTAGE REGULATOR

FIELD OF THE INVENTION

The present invention is related generally to voltage regulators and, more particularly, to a circuit and method for improving the load transient response of voltage regulators.

BACKGROUND OF THE INVENTION

In modern voltage regulator systems for microprocessor core voltage controlling, multi-phase control has been a popular control method for adapting high power density and high current slew rate requirements. However, conventional multi-phase control method is still insufficient to meet these ultra high load transient requirements in recent generations' voltage regulator (VR) specifications defined by Intel, especially during load application transient. Accordingly, an open-loop control mechanism called quick response was developed to overcome the undershoot problem. During load application transient, the quick response mechanism will instantaneously turn on all phases' upper gate (UG) to fully supply heavy load current demand, and the output voltage droop can therefore be controlled into correct load line specification. Even so, the quick response function still has some defects. For example, inaccurate turn-on or turn-off of quick response may result in unexpected ring back or second undershoot of output voltage.

FIG. 1 is a block diagram of an interleaving pulse width modulation (PWM) voltage regulator system with conventional quick response control scheme, which includes N phases, phase 1, phase 2, . . . , phase N, where N is a natural number, parallel connected between a power input $V_{IN}$ and a power output $V_{OUT}$. Each phase has a power stage 10 connected to the power input $V_{IN}$ and power output $V_{OUT}$, and a PWM comparator 12 to decide a pulse width modulation signal $PWM_j$, j=1, 2, . . . , or N, for the power stage 10 of this phase. In order to generate the per-phase pulse width modulation signals $PWM_1$, $PWM_2$, . . . , $PWM_N$, voltage divider resistors R1 and R2 divide the output voltage $V_{OUT}$ to generate a feedback signal $V_{FB}$, an error amplifier 14 compensates the error between the feedback signal $V_{FB}$ and a reference signal $V_{REF}$ and provides an amplified error signal $V_{COMP}$ into the positive inputs of each PWM comparator 12, and each PWM comparator 12 compares the error signal $V_{COMP}$ with a ramp signal $V_{RAMP}$ to decide the pulse width modulation signal $PWM_j$ of the corresponding phase. Each of the power stages 10 is controlled by the pulse width modulation signal $PWM_j$ of the corresponding phase to switch one or more power switches thereof, so as to generate the phase currents IL1, IL2, . . . , ILN, whose combination is the load current $I_{LOAD}$ supplying for the load 16. The function of quick response is implemented by a quick response generation circuit 18 and per-phase combiners 20. The quick response generation circuit 18 monitors the error signal $V_{COMP}$ to decide a quick response signal QR which triggers a quick response pulse when a load transient occurs. Each combiner 20 inserts the quick response pulse into the pulse width modulation signal $PWM_j$ of the corresponding phase. Alternatively, the quick response generation circuit 18 monitors the output voltage $V_{OUT}$ or the feedback signal $V_{FB}$ instead, in order to trigger the quick response pulse.

FIG. 2 is a simplified block diagram of a per-phase feedback control circuit extracted from FIG. 1 for detailed description about the conventional quick response control scheme. In order for particular distinction, the reference signals for the error amplifier 14 and the quick response comparator 22 are denoted by $V_{REF1}$ and $V_{REF2}$ respectively. The positive and negative inputs of a quick response comparator 22 receive the reference signal $V_{REF2}$ and feedback signal $V_{FB}$ respectively, to decide the quick response signal QR. The input voltages of the quick response comparator 22, $V_{REF2}$ and $V_{FB}$, are so designed to meet the circumstance that under steady state operation, $V_{REF2}$ will always be lower than $V_{FB}$ and hence the output of the quick response comparator 22 will always be zero. Therefore, the pulse width modulation signal PWM will always be determined only by the output of the PWM comparator 12 in steady state. Moreover, $V_{REF2}$ is so designed to meet the circumstance that $V_{REF2}$ will approach $V_{FB}$, either $V_{REF2}$ rising or $V_{FB}$ falling, during load application. When $V_{REF2}$ is higher than $V_{FB}$, the output QR of the quick response comparator 22 goes high and the output of the combiner 20 goes high according to the quick response pulse. Hence, during load application, the pulse width modulation signal PWM is determined not only by the output of the PWM comparator 12 but also by the output of the quick response comparator 22. In other words, the quick response pulse will be inserted into the normal pulse width modulation signal PWM and dominates the PWM pulse width during instant load application.

FIG. 3 is a timing diagram illustrating an operation mode of the conventional quick response control scheme in a four phase voltage regulator. At time t1, the load current $I_{LOAD}$ transits from $I_{MIN}$ to $I_{MAX}$, and the output voltage $V_{OUT}$ of the voltage regulator drops accordingly. At the moment the output voltage $V_{OUT}$ drops, the quick response comparator 22 will assert the quick response signal QR to instantaneously turn on all the pulse width modulation signals $PWM_1$-$PWM_4$ of the interleaved phases to supply this high load current demand. At time t2, the quick response period ends and the per-phase inductor currents are raised to a higher level, but the delay of gate signal transmission and per-phase inductor current imbalance cause the output voltage $V_{OUT}$ to exhibit a period of ringback phenomenon 24. After time t2, the pulse width modulation signal $PWM_3$ restarts its original PWM pulse and the subsequent PWM pulses will automatically adjust their pulse widths to regulate the output voltage $V_{OUT}$ to the desired level. However, the system will suffer a long period of current imbalance until the end of time t3. The time length of current imbalance depends on the quick response trigger point, quick response duration, inductor current level, restart point of the pulse width modulation signal PWM, . . . etc. This current imbalance phenomenon may cause unexpected ringback or short-term ringing of output voltage $V_{OUT}$ and hence increases the amount of output bulk or decoupling capacitors.

In order to resolve these defects of conventional quick response, a circuit and method of per-phase current balancing and pulse width adjustment of quick response is proposed. Altogether, the proposed new algorithm of quick response can achieve perfect adaptive voltage positioning (AVP) function without unnecessary undershoot or ringback of output voltage during load transient.

SUMMARY OF THE INVENTION

An object of the present invention is to provide a circuit with accurately controlled quick response signal.

Another object of the present invention is to provide a method with accurately controlled on-trigger edge, off-trigger edge and the width of a quick response signal.

Yet another object of the present invention is to provide a quick response multi-phase voltage regulator.

Still another object of the present invention is to provide a quick response method for a multi-phase voltage regulator.

According to the present invention, a quick response generation circuit for a voltage regulator includes two quick response comparators to compare a feedback signal related to the output voltage of the voltage regulator with two reference signals respectively, to determine a set signal and a reset signal. In response to the set signal and reset signal, a per-phase quick response signal determines a quick response pulse to be inserted into the pulse width modulation signal of the corresponding phase. The quick response pulse will force the upper power switch of the corresponding phase on, to connect the power input to the power output of the voltage regulator.

According to the present invention, a method for generating a quick response signal for a voltage regulator includes comparing a feedback signal related to the output voltage of the voltage regulator with two reference signals respectively, to determine a set signal and a reset signal which decide the on-trigger edge, off-trigger edge and the pulse width of the quick response signal.

According to the present invention, a multi-phase voltage regulator includes a power input, a power output to provide an output voltage, an error amplifier to generate an error signal from the difference between a feedback signal related to the output voltage and a reference signal, two PWM comparators to generate two pulse width modulation signals according to the error signal and two ramp signals to control two power stages to generate two phase currents respectively. Each of the power stages has a power switch connected between the power input and power output. Two quick response generation circuits provide two quick response signals to insert two quick response pulses into the two pulse width modulation signals to turn on the two power switches respectively. The two quick response pulses have different widths.

According to the present invention, a quick response method for a multi-phase voltage regulator includes generating two quick response signals to insert two quick response pulses into two pulse width modulation signals to turn on two upper power switches in two power stages of the multi-phase voltage regulator respectively. The two quick response pulses have different widths.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

A system according to the present invention contains two control loops, the first is the original PWM loop which contains an error amplifier and a PWM comparator to generate the original PWM signal, and the second is quick response loop which generates quick response signals. The quick response signals can be modulated according to some signals and therefore, they are separate from each other in a multi-phase voltage regulator.

Figure 1:
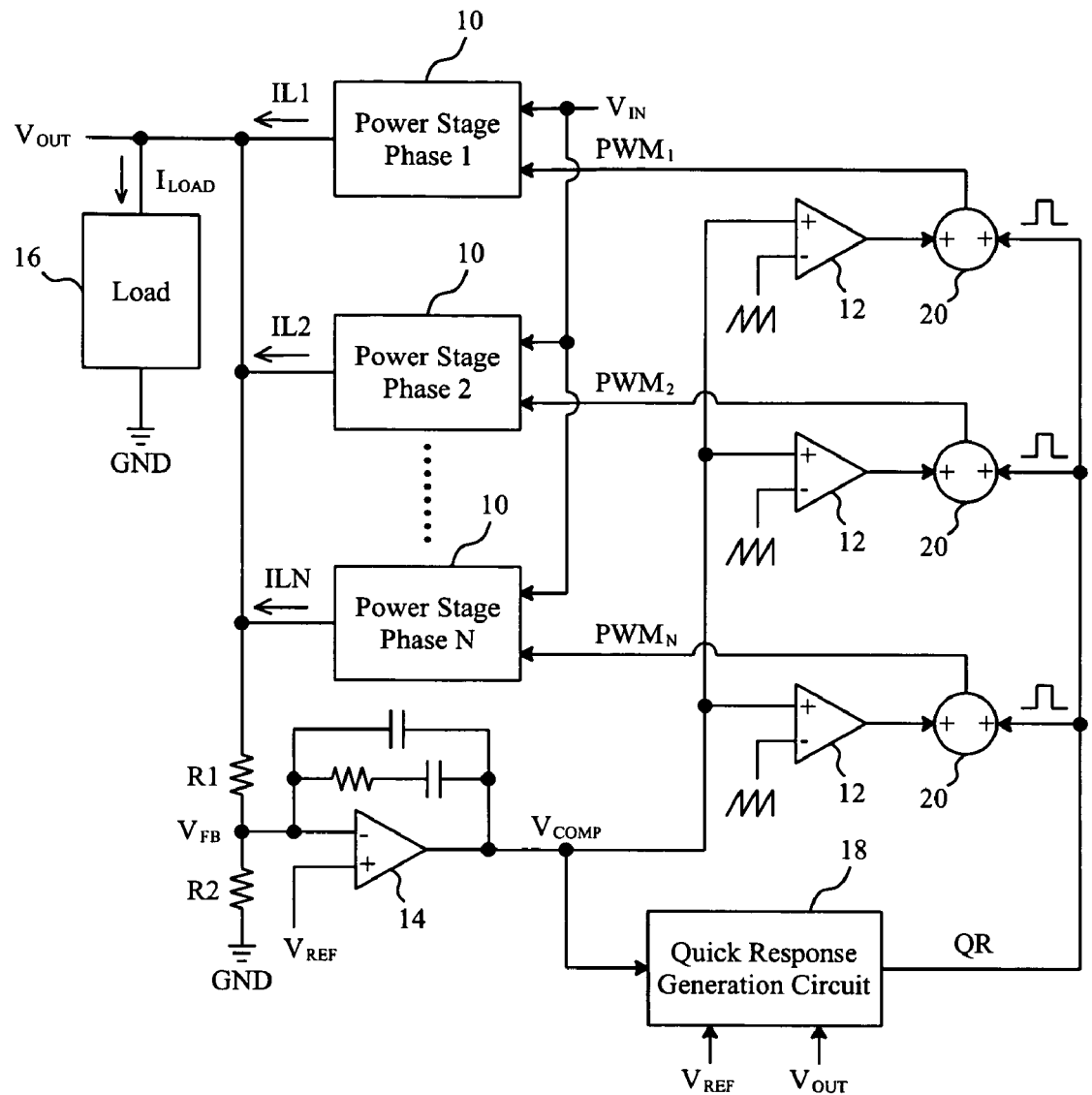
FIG. 1 is a block diagram of an interleaving PWM voltage regulator system with conventional quick response control scheme.
Figure 2:
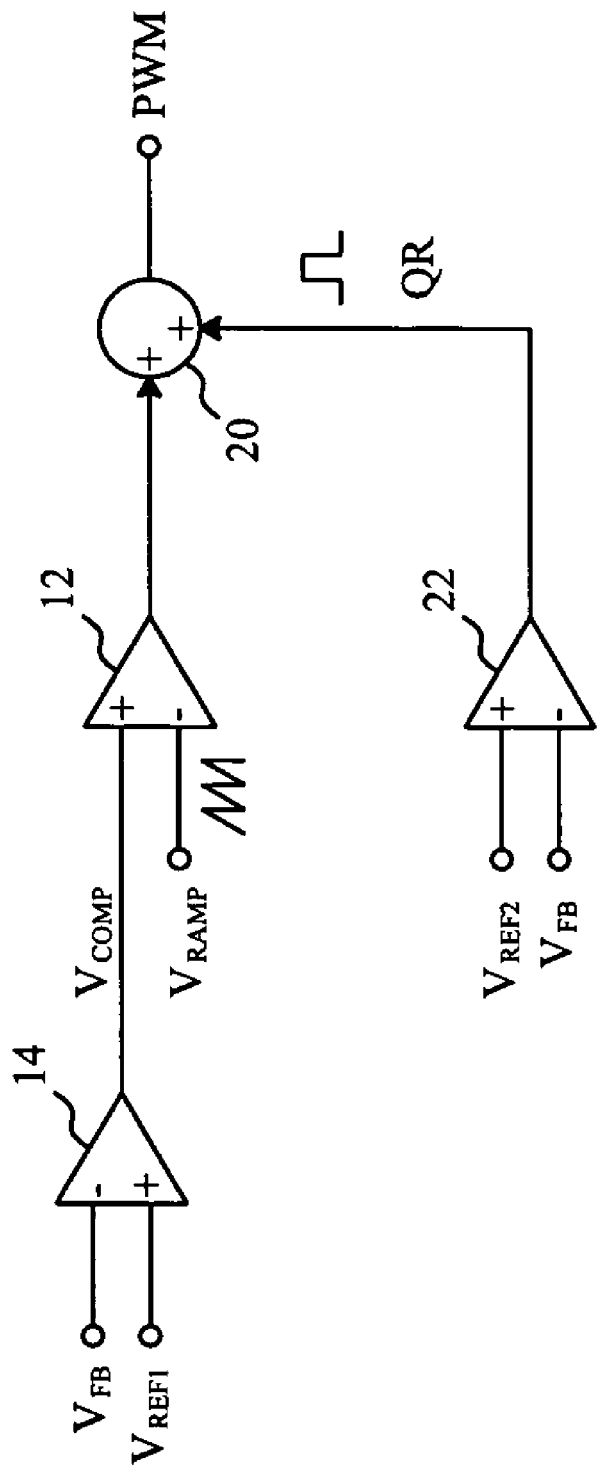
FIG. 2 is a simplified block diagram of a per-phase feedback control circuit extracted from FIG. 1 for detailed description about the conventional quick response control scheme.
Figure 3:
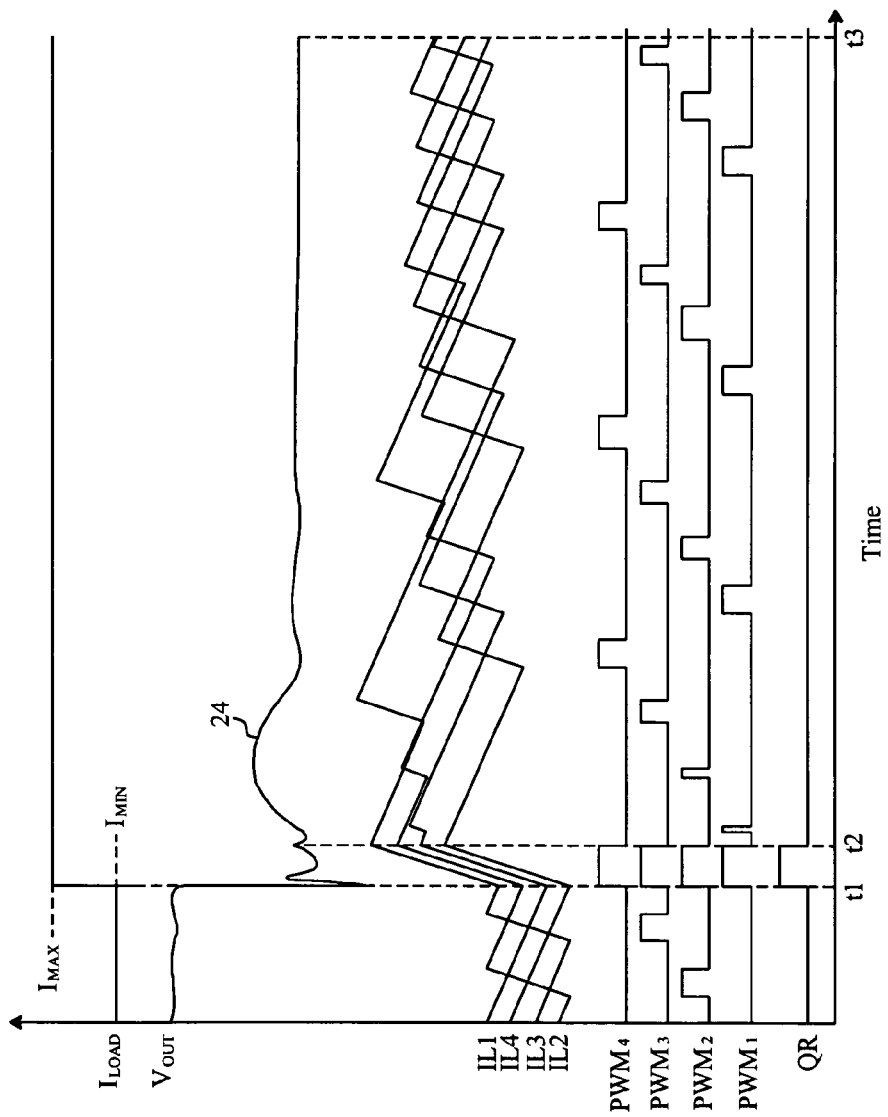
FIG. 3 is a timing diagram illustrating an operation mode of the conventional quick response control scheme in a four phase voltage regulator.
Figure 4:
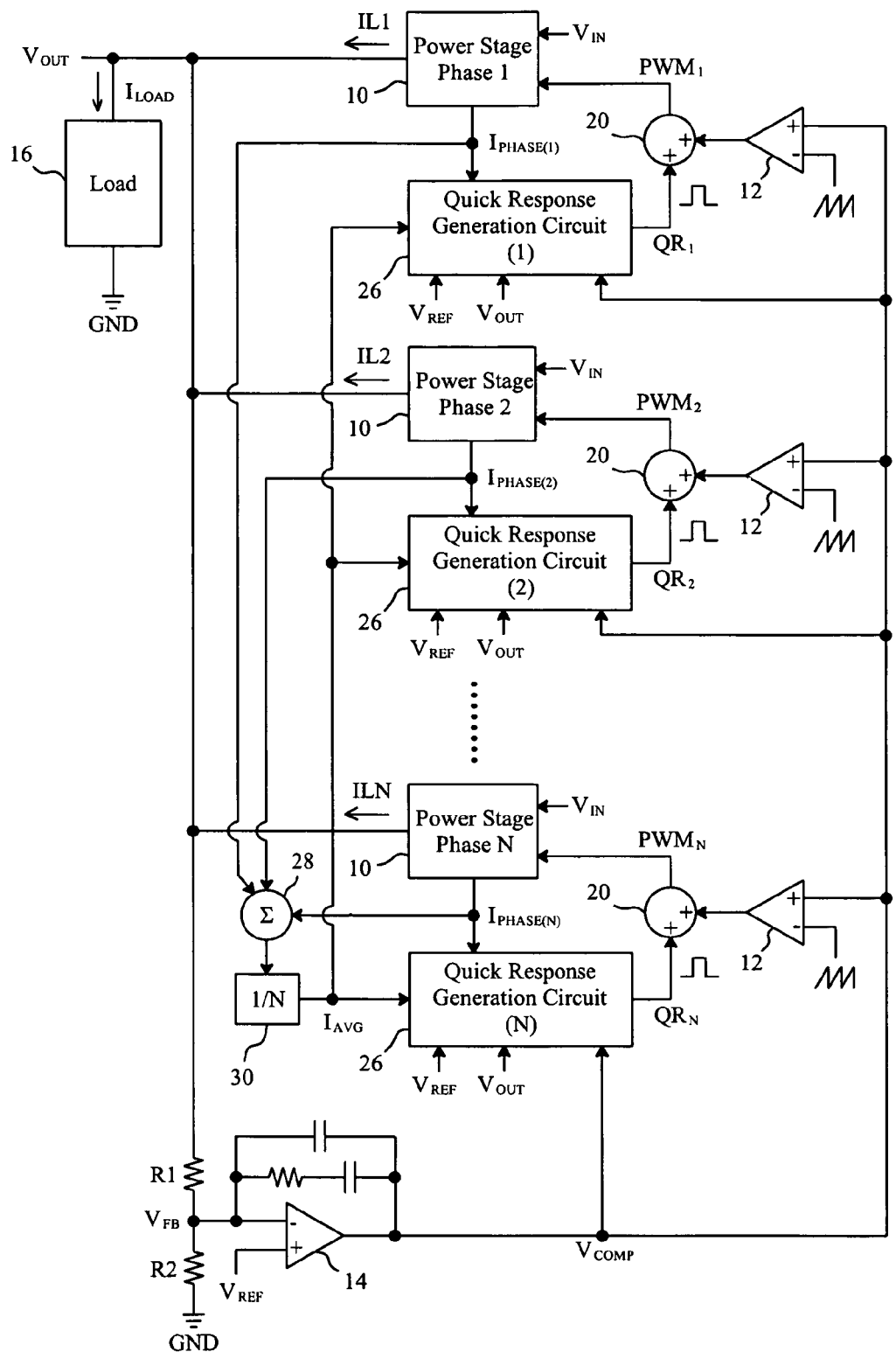
FIG. 4 is a block diagram of an interleaving PWM voltage regulator system with proposed quick response width modulation control scheme.

FIG. 4 is a block diagram of an interleaving PWM voltage regulator system with proposed quick response width modulation (QRWM) control scheme, which includes N phases parallel connected between a power input $V_{IN}$ and a power output $V_{OUT}$. Each phase has a power stage 10 connected to the power input $V_{IN}$ and power output $V_{OUT}$, a PWM comparator 12 to decide a pulse width modulation signal $PWM_j$, j=1, 2, . . . , or N, for the power stage 10 of this phase, a quick response generation circuit 26 to generate a quick response signal $QR_j$, j=1, 2, . . . , or N, which triggers a quick response pulse during load transient, and a combiner 20 to insert the quick response pulse into the pulse width modulation signal $PWM_j$ of this phase. The power stages 10 provide phase currents IL1, IL2, . . . , ILN respectively that are combined to be a load current $I_{LOAD}$ supplying for a load 16. Divider resistors R1 and R2 divide the output voltage $V_{OUT}$ of the voltage regulator to generate a feedback signal $V_{FB}$, an error amplifier 14 compensates the error between the feedback signal $V_{FB}$ and a reference signal $V_{REF}$ and provides an amplified error signal $V_{COMP}$ to the positive input of each PWM comparator 12, and each PWM comparator 12 compares the error signal $V_{COMP}$ with a ramp signal $V_{RAMP}$ to decide the pulse width modulation signal $PWM_j$ of the corresponding phase. In addition to be controlled by the corresponding pulse width modulation signal $PWM_j$, each power stage 10 further provides its phase current signal $I_{PHASE(j)}$, j=1, 2, . . . , or N, to a summation circuit 28 and the quick response generation circuit 26 of its phase. All the phase current signals $I_{PHASE(1)}$-$I_{PHASE(N)}$ are summed up by the summation circuit 28 and then divided by the phase number N by a division circuit 30, to generate an average current signal $I_{AVG}$ provided to each quick response generation circuit 26. Each quick response generation circuit 26 generates the quick response signal $QR_j$, j=1, 2, . . . , or N, according to the average current signal $I_{AVG}$, phase current signal $I_{PHASE(j)}$ of its corresponding phase, and error signal $V_{COMP}$. In each phase, the quick response signal $QR_j$ and the output of the PWM comparator 12 are combined by a combiner 20 to be the pulse width modulation signal $PWM_j$. In other embodiments, the quick response generation circuit 26 may monitor the output voltage $V_{OUT}$ or the feedback signal $V_{FB}$, instead of the error signal $V_{COMP}$, in order to decide the quick response signal $QR_j$. Since the quick response signals $QR_1$-$QR_N$ are generated per phase by the respective quick response generation circuit 26, the on-trigger edge, off-trigger edge and pulse width of each quick response signal $QR_j$ can be decided phase by phase. Namely, the quick response signals $QR_1$-$QR_N$ of this voltage regulator system may not be the same.

Figure 5:
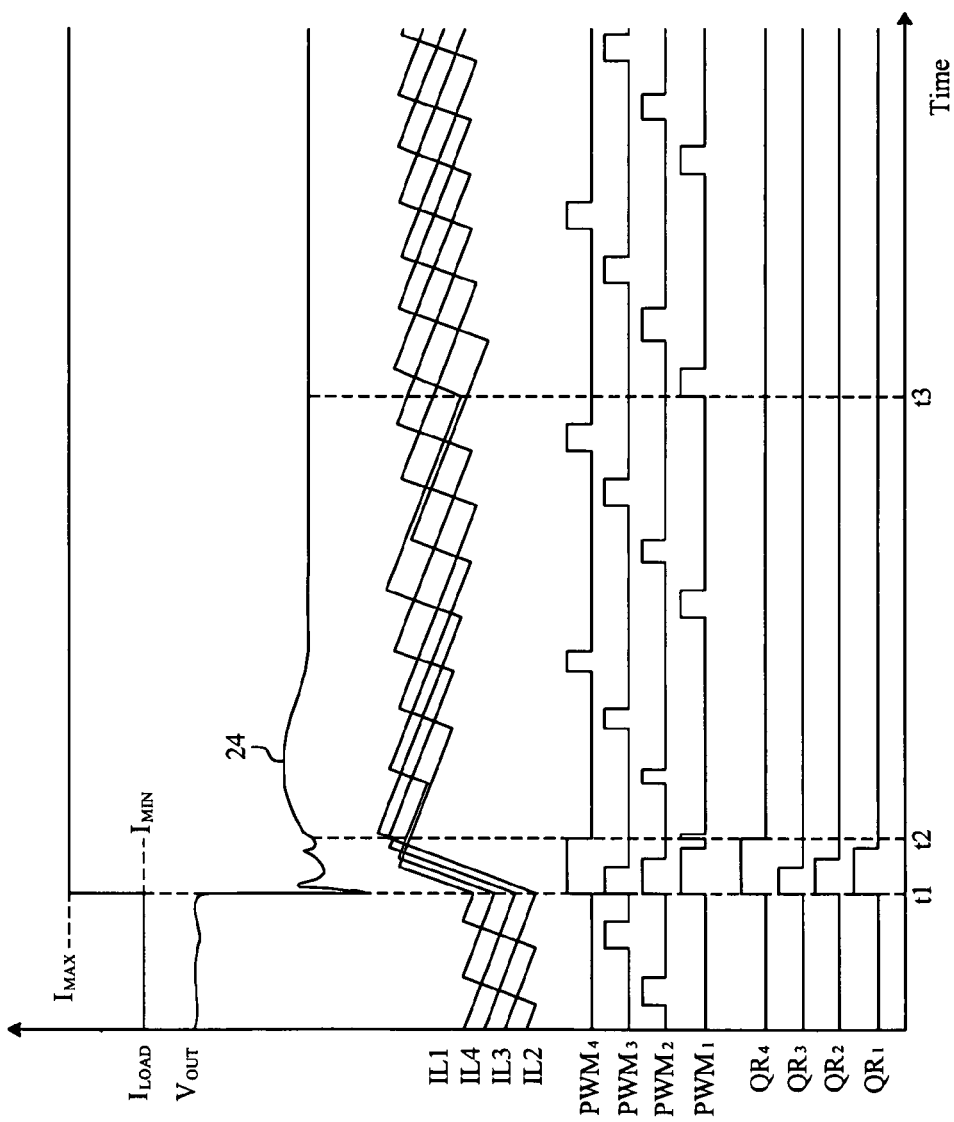
FIG. 5 is a timing diagram illustrating an operation mode of proposed quick response width modulation control scheme.

FIG. 5 is a timing diagram illustrating an operation mode of proposed quick response width modulation control scheme. At time t1, the load current $I_{LOAD}$ transits from $I_{MIN}$ to $I_{MAX}$, and the output voltage $V_{OUT}$ drops accordingly. The set signal of the quick response is unique in this embodiment, which means each interleaved phase the same set signal and per-phase PWM will turn on at the same time when the quick response is triggered. As shown in FIG. 5, at the moment $V_{OUT}$ dropping, all the quick response generation circuits 26 triggers their own quick response signal $QR_j$ simultaneously. However, the reset signal of the quick response is different among the interleaved phases and will be determined by each phase's own quick response generation circuit 26. Therefore, the turn-off edge of each quick response signal $QR_1$-$QR_N$ will be different and is related to their own phase current, that is, the phase which has the largest phase current during the load application will have the shortest quick response pulse width. The larger the phase current is, the earlier the quick response of the corresponding phase terminates. As a result, the quick response widths of the interleaved phases may not be the same. This mechanism forces each phase's inductor current to be balanced during load application transient. As shown in FIG. 5, the quick response signal $QR_3$ is turned off first, then take turns to $QR_2$, $QR_1$, till time t2 the quick response signal $QR_4$ is turned off in the end. Therefore, the time points of the phase currents IL1-IL4 beginning to fall down are different and the current imbalance after the load transient is reduced or even eliminated. This current-adjusting scheme for quick response width modulation can reduce the ringback 24 and improve the settling of the output voltage $V_{OUT}$.

Figure 6:
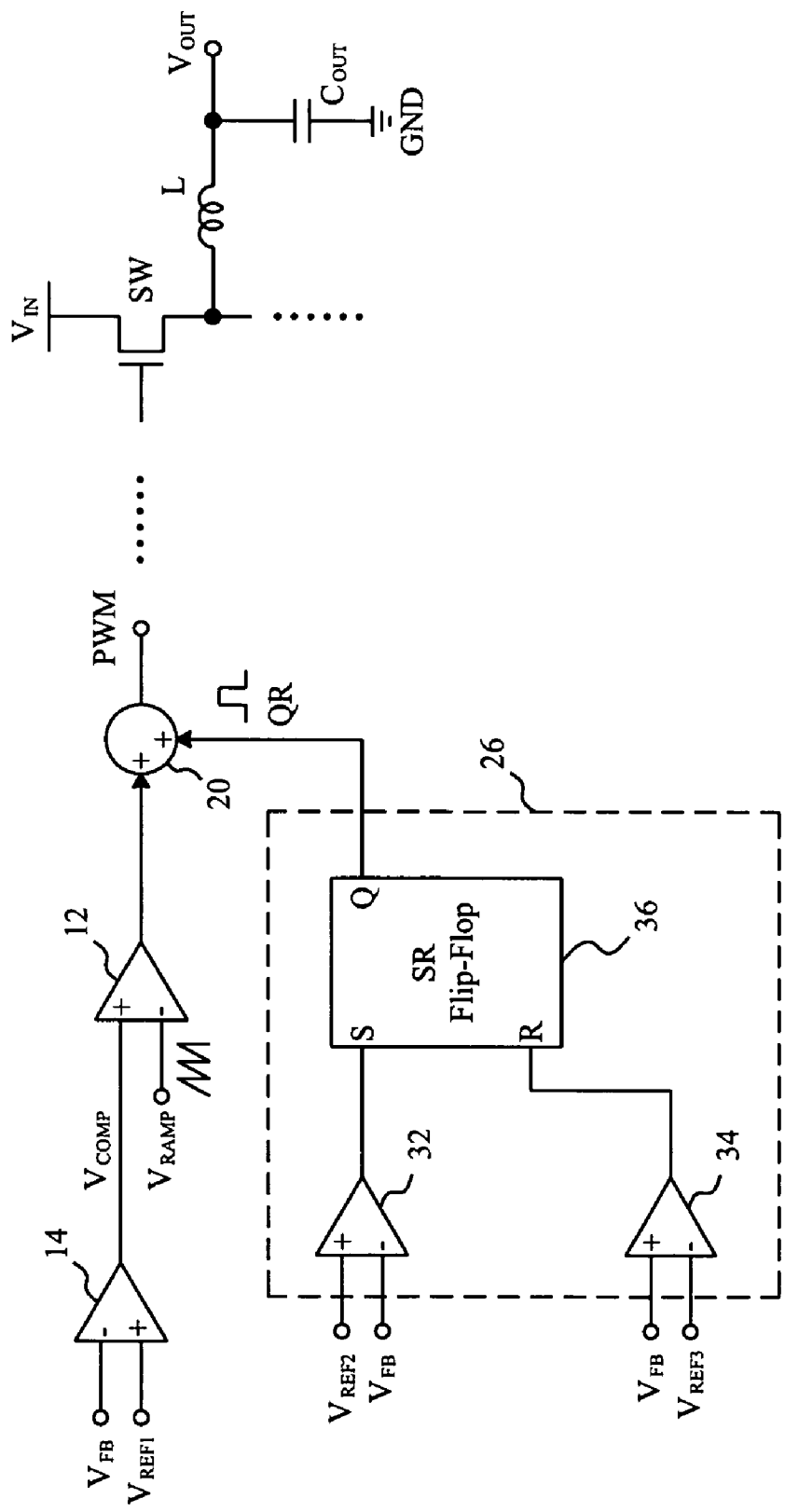
FIG. 6 is a simplified block diagram of per-phase feedback control circuit extracted from FIG. 4 to illustrate the proposed quick response width modulation control scheme.

In further detail, FIG. 6 is a simplified block diagram of per-phase feedback control circuit extracted from FIG. 4 to illustrate the proposed quick response width modulation control scheme. In this embodiment, the quick response generation circuit 26 includes quick response comparators 32, 34 and a SR flip-flop 36. The quick response comparator 32 compares the feedback signal $V_{FB}$ with a reference signal $V_{REF2}$ to decide the setting input of the SR flip-flop 36, and the quick response comparator 34 compares the feedback signal $V_{FB}$ with a reference signal $V_{REF3}$ to decide the resetting input of the SR flip-flop 36. Under steady state operation, the output of the quick response comparator 32 will always stay low, the output of the SR flip-flop 36 will always be zero, and the pulse width modulation signal PWM decided by the PWM comparator 12 alone. During load application transient, the on-trigger edge of the quick response signal QR will be determined by the quick response comparator 32 and the off-trigger edge of the quick response signal QR will be determined by the quick response comparator 34. Hence the turn-on edge position, turn-off edge position and pulse width of the quick response signal QR can be adjusted according to the designed values of $V_{REF2}$ and $V_{REF3}$. If all the quick response generation circuits 26 of FIG. 4 are designed as having a same value of $V_{REF2}$ but having different values of $V_{REF3}$, the quick response signals $QR_1$-$QR_N$ will be triggered at a same time but terminated at different times. The right side of FIG. 6 shows a part circuit of the power stage 10, which receives the pulse width modulation signal PWM to switch the upper power switch SW thereof. During load application transient, the quick response pulse of the quick response signal QR is inserted into the output of the PWM comparator 12 through the combiner 20, and forces the upper power switch SW to be on so as to increase the ability of providing the phase current. In this embodiment, the circuit of generating the quick response signal QR is implemented by the SR flip-flop 36; in other embodiments, the SR flip-flop 36 may be replaced by other element or circuit able to assert the quick response signal QR.

Figure 7:
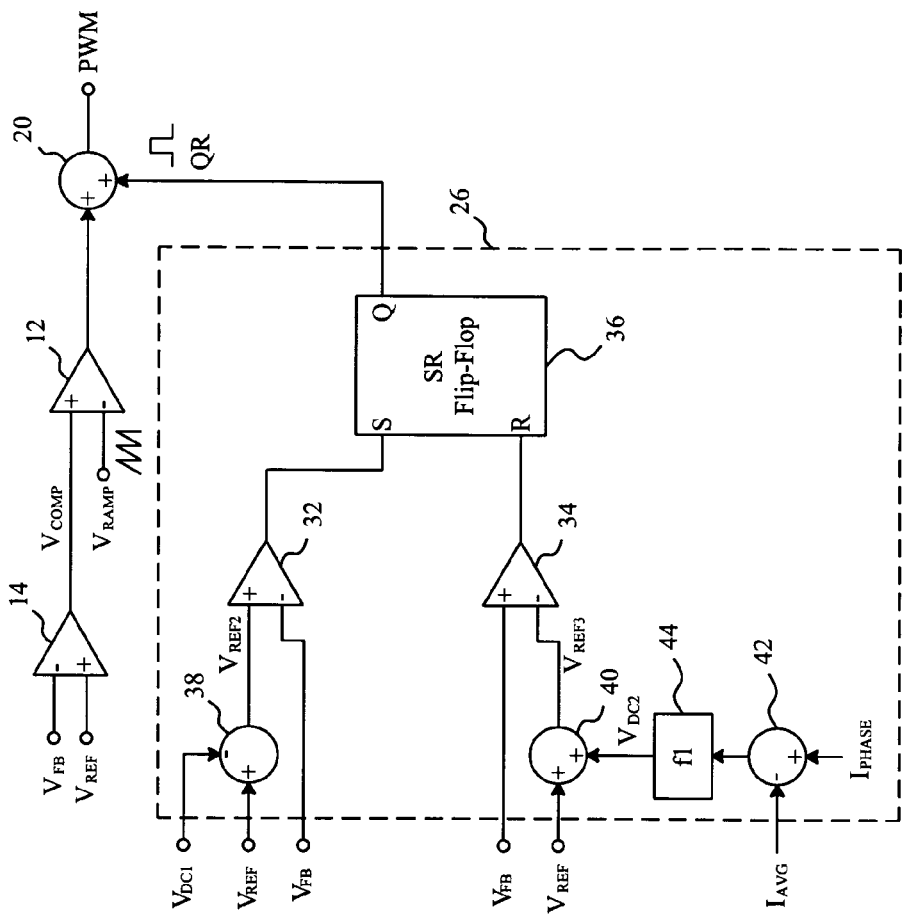
FIG. 7 is a modification of the quick response generation circuit shown in FIG. 6.

FIG. 7 is a modification of the quick response generation circuit 26 shown in FIG. 6. A combiner 38 subtracts a bias voltage $V_{DC1}$ from the reference signal $V_{REF}$ to generate the reference signal $V_{REF2}$ (=$V_{REF}$-$V_{DC1}$) as the positive input of the quick response comparator 32, and a combiner 40 adds a bias voltage $V_{DC2}$ to the reference signal $V_{REF}$ to generate the reference signal $V_{REF3}$ (=$V_{REF}$+$V_{DC2}$) as the negative input of the quick response comparator 34. To generate the bias voltage $V_{DC2}$, the difference between the per-phase current signal $I_{PHASE}$ and average current signal $I_{AVG}$ is obtained by a combiner 42, and then transformed into the bias voltage $V_{DC2}$ by a transducer 44 having a transform function f1. The set signal of quick response is determined by the quick response comparator 32. When load application transient occurs, if the feedback signal $V_{FB}$ drops below $V_{REF2}$ (=$V_{REF}$-$V_{DC1}$), then the quick response comparator 32 sends out a set signal S to initiate quick response. The reset signal of quick response is determined by the quick response comparator 34. If $V_{FB}$ rises above $V_{REF3}$ (=$V_{REF}$+$V_{DC2}$), then the quick response comparator 34 will send out a reset signal R to terminate quick response. In this embodiment, the values of $V_{DC1}$ and $V_{DC2}$ will determine the turn-on threshold and turn-off threshold of quick response scheme in which $V_{DC1}$ and $V_{DC2}$ can be different between the interleaved phases, e.g., $V_{DC2}$ is a function f1 dependent of per-phase error current signal such that $V_{DC2}$=f1×($I_{PHASE}$-$I_{AVG}$), which means per-phase reset signals R of quick response will be different depending on their sensed phase currents $I_{PHASE}$. The transform function f1 will transform per-phase current signal $I_{PHASE}$ into suited bias voltage $V_{DC2}$ and f1 can be any kind of arithmetic transformation.

Figure 8:
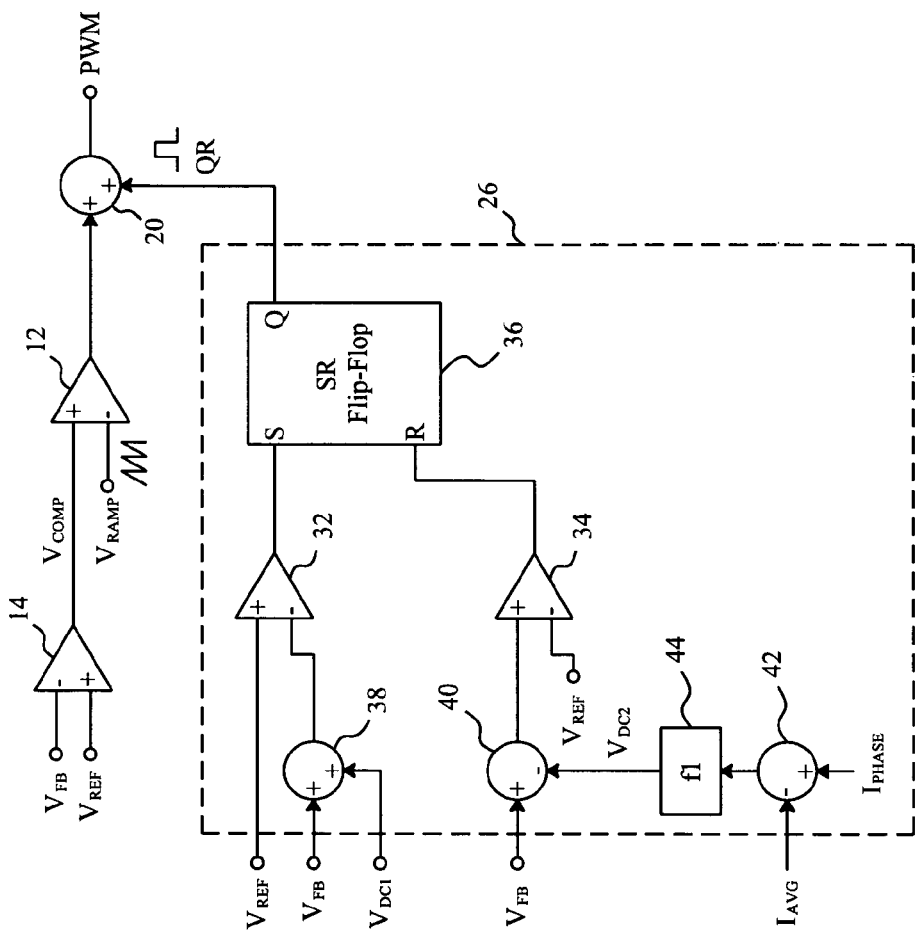
FIG. 8 is an embodiment equivalent to the quick response generation circuit of FIG. 7.

A person who is skilled in this art should understand that a signal enters into the positive input of a comparator is equivalent to a negative of the signal enters into the negative input of the comparator. FIG. 8 shows an embodiment equivalent to the quick response generation circuit 26 of FIG. 7. The combiner 38 adds the bias voltage $V_{DC1}$ to the feedback signal $V_{FB}$ as the negative input ($V_{FB}$+$V_{DC1}$) of the quick response comparator 32, and the combiner 40 subtracts the bias voltage $V_{DC2}$ from the feedback signal $V_{FB}$ as the positive input ($V_{FB}$-$V_{DC2}$) of the quick response comparator 34. The bias voltage $V_{DC2}$ is generated by the same way as that shown in FIG. 7. $V_{DC1}$ is a constant voltage designed for DC level shifting applications and $V_{DC2}$ is a function f1 dependent of per-phase current $I_{PHASE}$ such that $V_{DC2}$=f1×($I_{PHASE}$-$I_{AVG}$). The transducer 44 will transform per-phase error current signal into suited voltage signal $V_{DC2}$ and the function f1 can be any kind of arithmetic transformation. Therefore, each interleaved phase's quick response signal QR is different and the pulse width of each phase's quick response signal QR will be dependent on their sensed current signals. More equivalent circuits to insert the bias voltages $V_{DC1}$ and $V_{DC2}$ into the quick response comparators 32 and 34 may be designed based on the same principle.

Figure 9:
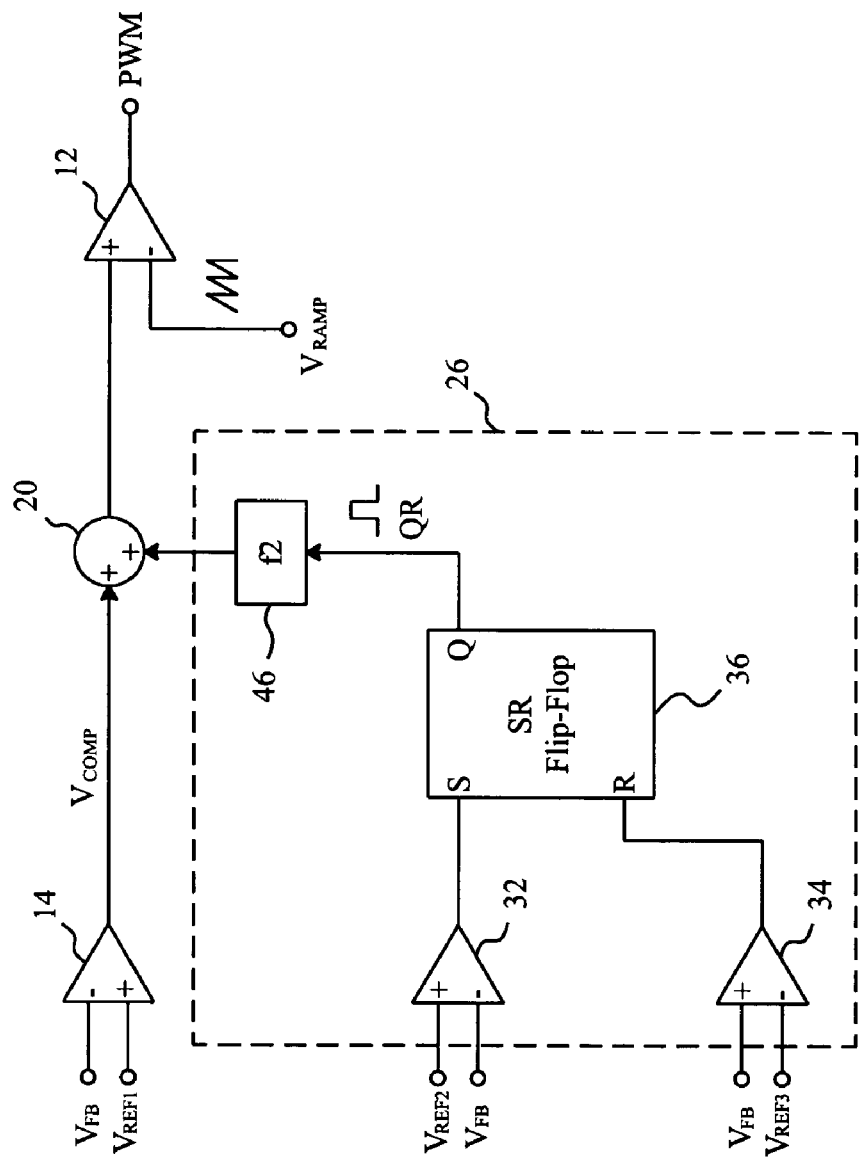
FIG. 9 is an embodiment to insert a quick response signal into the positive input of the PWM comparator.

A person who is skilled in this art should understand that a signal can be inserted everywhere into a PWM loop for a same purpose. FIG. 9 provides an embodiment which inserts the quick response signal QR into the positive input of the PWM comparator 12. The quick response comparators 32 and 34 and the SR flip-flop 36 are configured as that shown in FIG. 6. The set signal S is determined by the quick response comparator 32 which compares $V_{FB}$ with $V_{REF2}$. The reset signal R is determined by the quick response comparator 34 which compares $V_{FB}$ with $V_{REF3}$. The output of the SR flip-flop 36, the modulated quick response signal QR, is transformed by a transducer 46 into a suited voltage signal to modulate the original error signal $V_{COMP}$ by the combiner 20. The transform function f2 of the transducer 46 can be any kind of arithmetic transformation. The purpose of inserting the quick response signal QR into the positive input of the PWM comparator 12 is also to modulate each phase's PWM signal, in order to instantaneously turn on the upper switches of each power stage 10 to supply load application transient, and to achieve the same function as the embodiment of FIG. 6.

Figure 10:
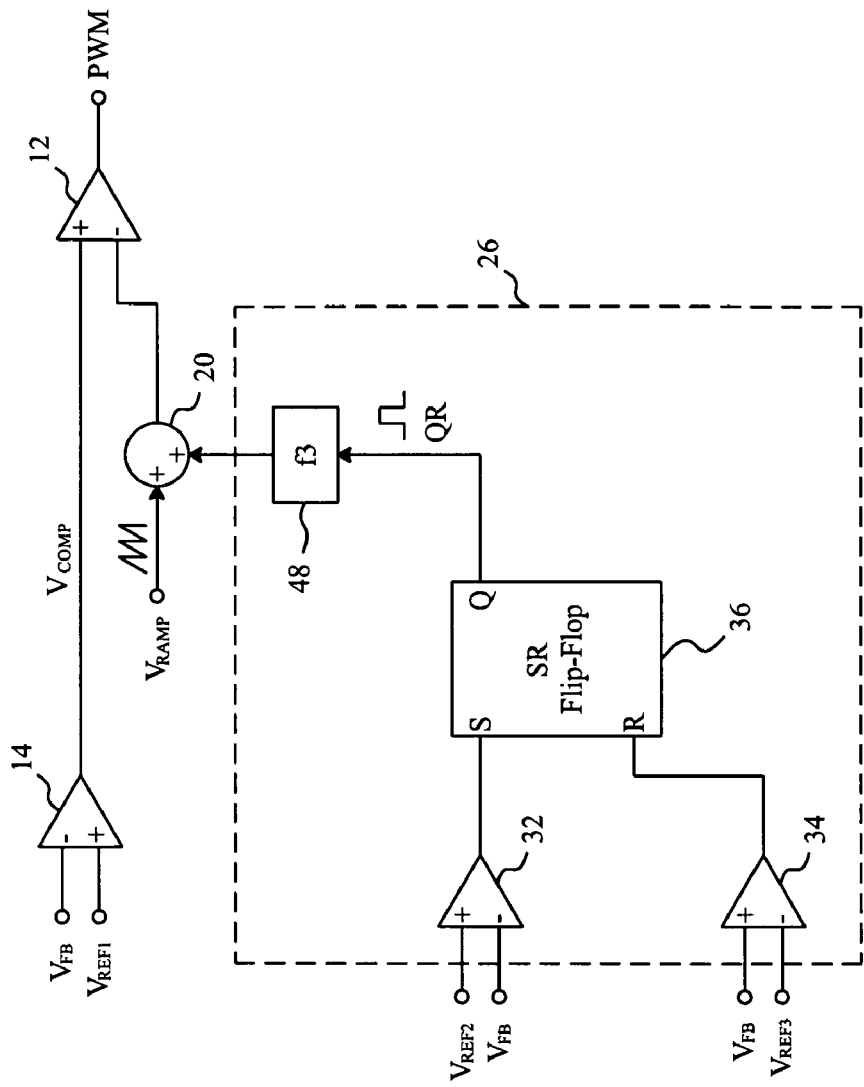
FIG. 10 is an embodiment to insert a quick response signal into the negative input of the PWM comparator.

Alternatively, the embodiment shown in FIG. 10 inserts the quick response signal QR into the negative input of the PWM comparator 12. In this case, the output of the SR flip-flop 36, i.e. the modulated quick response signal QR, is transformed by a transducer 48 whose transform function f3 can be any kind of arithmetic transformation, into a suited voltage signal to modulate the original ramp signal $V_{RAMP}$ by the combiner 20. The purpose and function of this embodiment are the same as that of FIG. 6.

A person who is skilled in this art should understand that in other embodiments implementing the quick response pulse modulation scheme of FIG. 6, the inputs (at positive input or negative input) of the quick response comparators 32 and 34 could be the output voltage of the voltage regulator, the output of the error amplifier 14, the reference signal at the input of the error amplifier 14, a sensed signal representative of the phase current, or any, other possible arithmetic combinations of these signals.

Although the quick response mechanism may have been developed and used for many years in VR applications, the key improvement of the proposed quick response width modulation scheme is that the system will not produce only single quick response signal shared by each interleaved phase, but will accurately control the trigger, terminate and pulse width of the quick response signal per-phase in a multi-phase voltage regulator, and further, modulate the pulse width of each phase's individual quick response signal according to per-phase current thereof. The modulated quick response signal can be inserted into anywhere of a normal control loop in each interleaved phase, such as the positive input of PWM comparator, the negative input of PWM comparator, the output of PWM comparator, the input of error amplifier, or the output of error amplifier. In conclusion, the quick response signal of each interleaved phase can be different, and thus the pulse width and starting-ending-position of quick response pulses of each interleaved phase can also be different. Separated quick response signal of each interleaved phase will result in better performance of VR systems, especially in load application transient for core voltage regulation.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A quick response generation circuit for a voltage regulator which generates a regulated output voltage at a power output and has a power switch connected between a power input and the power output to be switched by a pulse width modulation signal, the quick response generation circuit comprising:
   a first quick response comparator comparing a feedback signal related to the output voltage with a first reference signal to thereby determine a set signal;
   a second quick response comparator comparing the feedback signal with a second reference signal to thereby determine a reset signal; and
   a quick response signal generator connected to the first and second quick response comparators, in response to the set signal and the reset signal, to determine a quick response signal having a quick response pulse to be inserted into the pulse width modulation signal;
   wherein the power switch is on during the period of the quick response pulse to connect the power input to the power output.

2. The quick response generation circuit of claim 1, wherein the feedback signal is substantially proportional to the output voltage.

3. The quick response generation circuit of claim 1, wherein the first and second reference signals are not equal to each other.

4. The quick response generation circuit of claim 1, further comprising a combiner subtracting a bias voltage from a third reference signal to generate the first reference signal.

5. The quick response generation circuit of claim 1, wherein the quick response signal generator comprises a SR flip-flop having a set input receiving the set signal and a reset input receiving the reset signal.

6. The quick response generation circuit of claim 1, further comprising:
   a combiner adding a bias voltage to the feedback signal to level shift the feedback signal;
   wherein the first quick response comparator has a first input receiving the first reference signal and a second input receiving the level shifted feedback signal.

7. The quick response generation circuit of claim 1, further comprising:
   a first combiner subtracting an average current signal from a phase current signal of the voltage regulator to generate a current error signal;
   a transducer transforming the current error signal into a bias voltage; and
   a second combiner adding the bias voltage to the second reference signal to level shift the second reference signal;
   wherein the second quick response comparator has a positive input receiving the feedback signal and a negative input receiving the level shifted second reference signal.

8. The quick response generation circuit of claim 1, further comprising:
   a first combiner subtracting an average current signal from a phase current signal of the voltage regulator to generate a current error signal;
   a transducer transforming the current error signal into a bias voltage; and
   a second combiner subtracting the bias voltage from the feedback signal to level shift the feedback signal;
   wherein the second quick response comparator has a positive input receiving the level shifted feedback signal and a negative input receiving the second reference signal.

9. A method for generating a quick response signal for a voltage regulator which generates a regulated output voltage at a power output and has a power switch connected between a power input and the power output to be switched by a pulse width modulation signal, the quick response signal having a quick response pulse to be inserted into the pulse width modulation signal such that the power switch will be on during the period of the quick response pulse to connect the power input to the power output, the method comprising the steps of:
   comparing a feedback signal related to the output voltage with a first reference signal to determine a set signal;

comparing the feedback signal with a second reference signal to determine a reset signal; and triggering the quick response pulse by the set signal and terminating the quick response pulse by the reset signal.

10. The method of claim 9, further comprising the step of dividing the output voltage to generate the feedback signal.

11. The method of claim 9, wherein the first and second reference signals are not equal to each other.

12. The method of claim 9, further comprising the step of subtracting a bias voltage from a third reference signal to generate the first reference signal.

13. The method of claim 9, further comprising the steps of:
adding a bias voltage to the feedback signal to level shift the feedback signal; and
comparing the level shifted feedback signal with the first reference signal to determine the set signal.

14. The method of claim 9, further comprising the steps of:
subtracting an average current signal from a phase current signal of the voltage regulator to generate a current error signal;
transforming the current error signal into a bias voltage;
adding the bias voltage to the second reference signal to level shift the second reference signal; and
comparing the feedback signal with the level shifted second reference signal to determine the reset signal.

15. The method of claim 9, further comprising the steps of:
subtracting an average current signal from a phase current signal of the voltage regulator to generate a current error signal;
transforming the current error signal into a bias voltage;
subtracting the bias voltage from the feedback signal to level shift the feedback signal; and
comparing the level shifted feedback signal with the second reference signal to determine the reset signal.

16. A multi-phase voltage regulator, comprising:
a power input;
a power output having an output voltage thereon;
an error amplifier generating an error signal from a difference between a feedback signal related to the output voltage and a reference signal;
a first PWM comparator connected to the error amplifier, providing a first pulse width modulation signal according to the error signal and a first ramp signal;
a first power stage having a first phase current signal and a first power switch connected between the power input and the power output to be switched by the first pulse width modulation signal;
a second PWM comparator connected to the error amplifier, providing a second pulse width modulation signal according to the error signal and a second ramp;
a second power stage having a second phase current signal and a second power switch connected between the power input and the power output to be switched by the second pulse width modulation signal;
a first quick response generation circuit providing a first quick response signal to insert a first quick response pulse into the first pulse width modulation signal to turn on the first power switch; and
a second quick response generation, circuit providing a second quick response signal to insert a second quick response pulse into the second pulse width modulation signal to turn on the second power switch;
wherein the first and second quick response pulses have different widths.

17. The multi-phase voltage regulator of claim 16, further comprising a combiner adding the first quick response signal to an output of the first PWM comparator.

18. The multi-phase voltage regulator of claim 16, further comprising:
a transducer transforming the first quick response signal into a voltage signal; and
a combiner adding the voltage signal to a positive input of the first PWM comparator.

19. The multi-phase voltage regulator of claim 16, further comprising:
a transducer transforming the first quick response signal into a voltage signal; and
a combiner adding the voltage signal to a negative input of the first PWM comparator.

20. The multi-phase voltage regulator of claim 16, further comprising a combiner adding the first quick response signal to an output of the error amplifier.

21. The multi-phase voltage regulator of claim 16, further comprising:
a transducer transforming the first quick response signal into a voltage signal; and
a combiner adding the voltage signal to a positive input of the error amplifier.

22. The multi-phase voltage regulator of, claim 16, further comprising:
a transducer transforming the first quick response signal into a voltage signal; and
a combiner adding the voltage signal to a negative input of the error amplifier.

23. The multi-phase voltage regulator of claim 16, wherein the first quick response generation circuit comprises:
a first quick response comparator comparing the feedback signal with a first reference signal to determine a set signal;
a second quick response comparator comparing the feedback signal with a second reference signal to determine a reset signal; and
a quick response signal generator connected to the first and second quick response comparators, generating the quick response signal according to the set signal and the reset signal.

24. The multi-phase voltage regulator of claim 23, wherein the first and the second reference signals are not equal to each other.

25. The multi-phase voltage regulator of claim 23, wherein the first quick response generation circuit further comprises a combiner subtracting a bias voltage from the reference signal to generate the first reference signal.

26. The multi-phase voltage regulator of claim 23, wherein the first quick response generation circuit further comprises:
a combiner adding a bias voltage to the feedback signal to level shift the feedback signal;
wherein the first quick response comparator has a positive input receiving the reference signal as the first reference signal and a negative input receiving the level shifted feedback signal.

27. The multi-phase voltage regulator of claim 23, wherein the first quick response generation circuit further comprises:
a first combiner subtracting an average current signal of the voltage regulator from the first phase current signal to generate a current error signal;
a transducer transforming the current error signal into a bias voltage; and
a second combiner adding the bias voltage to the reference signal to generate the second reference signal;
wherein the second quick response comparator has a positive input receiving the feedback signal and a negative input receiving the second reference signal.

28. The multi-phase voltage regulator of claim 27, further comprising:
- a summation circuit adding the first and second phase current signals to generate a summation current signal; and
- a division circuit averaging the summation current signal to generate the average current signal.

29. The multi-phase voltage regulator of claim 23, wherein the first quick response generation circuit further comprises:
- a first combiner subtracting an average current signal of the voltage regulator from the first phase current signal to generate a current error signal;
- a transducer transforming the current error signal into a bias voltage; and
- a second combiner subtracting the bias voltage from the feedback signal to level shift the feedback signal;
- wherein the second quick response comparator has a positive input receiving the level shifted feedback signal and a negative input receiving the reference signal as the second reference signal.

30. The multi-phase voltage regulator of claim 29, further comprises:
- a summation circuit adding the first and second phase current signals to generate a summation current signal; and
- a division circuit averaging the summation current signal to generate the average current signal.

31. The multi-phase voltage regulator of claim 23, wherein the quick response signal generator comprises a SR flip-flop having a set input receiving the set signal and a reset input receiving the reset signal.

32. A quick response method for a multi-phase voltage regulator which generates an error signal from a difference between a feedback signal and a reference signal, and two pulse width modulation signals by comparing the error signal with two ramp signals to control two power stages to produce two phase currents respectively, each of the two power stages having a power switch connected between a power input and a power output, the method comprising the steps of:
- generating a first quick response signal to insert a first quick response pulse into the first one of the two pulse width modulation signals to turn on the first one of the two power switches; and
- generating a second quick response signal to insert a second quick response pulse into the second one of the two pulse width modulation signals to turn on the second one of the two power switches;
- wherein the first and second quick response pulses have different widths.

33. The method of claim 32, further comprising the step of combining the first quick response signal with the first pulse width modulation signal.

34. The method of claim 32, further comprising the steps of:
- transforming the first quick response signal into a voltage signal; and
- adding the voltage signal to the error signal.

35. The method of claim 32, further comprising the steps of:
- transforming the first quick response signal into a voltage signal; and
- adding the voltage signal to the ramp signal.

36. The method of claim 32, further comprising the steps of:
- transforming the first quick response signal into a voltage signal; and
- adding the voltage signal to the feedback signal.

37. The method of claim 32, further comprising the steps of:
- transforming the first quick response signal into a voltage signal; and
- adding the voltage signal to the reference signal.

38. The method of claim 32, wherein the step of generating the first quick response signal comprises the steps of:
- comparing the feedback signal with a second reference signal to generate a set signal;
- comparing the feedback signal with a third reference signal to generate a reset signal; and
- triggering the first quick response pulse by the set signal and terminating the first quick response pulse by the reset signal.

39. The method of claim 38, further comprising the step of subtracting a bias voltage from the reference signal to generate the second reference signal.

40. The method of claim 38, wherein the step of generating a set signal comprises the steps of:
- using the reference signal as the second reference signal;
- adding a bias voltage to the feedback signal to level shift the feedback signal; and
- comparing the second reference signal with the level shifted feedback signal to determine the set signal.

41. The method of claim 38, wherein the step of generating the reset signal comprises the steps of:
- subtracting the first one of the two phase currents from an average current to generate a differential current;
- transforming the differential current into a bias voltage; and
- adding the bias voltage to the reference signal to generate the third reference signal.

42. The method of claim 41, further comprising the steps of:
- adding the first and second phase currents to generate a summation current; and
- averaging the summation current to generate the average current.

43. The method of claim 38, wherein the step of generating a reset signal comprises the steps of:
- using the reference signal as the third reference signal;
- subtracting the first one of the two phase currents from an average current to generate a differential current;
- transforming the differential current into a bias voltage;
- subtracting the bias voltage from the feedback signal to level shift the feedback signal; and
- comparing the level shifted feedback signal with the third reference signal to determine the reset signal.

44. The method of claim 42, further comprising the steps of:
- adding the first and second phase currents to generate a summation current; and
- averaging the summation current to generate the average current.

* * * * *